United States Patent [19]

Nooijen et al.

[11] Patent Number: 4,593,346

[45] Date of Patent: Jun. 3, 1986

[54] POWER SUPPLY CIRCUIT HAVING TWO MUTUALLY INDEPENDENT OUTPUTS

[75] Inventors: Fransiscus M. J. Nooijen; Christianus H. J. Bergmans, both of Eindhoven, Netherlands

[73] Assignee: U.S. Philips Corporation, New York, N.Y.

[21] Appl. No.: 593,071

[22] Filed: Mar. 26, 1984

[30] Foreign Application Priority Data

Apr. 11, 1983 [NL] Netherlands .......................... 8301263

[51] Int. Cl.$^4$ ........................ H02M 3/335; H04N 3/18
[52] U.S. Cl. ......................................... 363/21; 363/60
[58] Field of Search ....................... 363/20, 21, 59, 60, 363/61, 75, 97; 315/205, 206, 39.51

[56] References Cited

U.S. PATENT DOCUMENTS

| | | | |
|---|---|---|---|
| 3,708,741 | 1/1973 | Hekimiam | 363/60 |
| 3,737,758 | 6/1973 | Allington | 363/60 |
| 3,828,239 | 8/1974 | Nagai et al. | 363/20 |
| 4,017,784 | 4/1977 | Simmons et al. | 321/2 |
| 4,128,868 | 12/1978 | Gamble | 363/97 |
| 4,253,136 | 2/1981 | Nanko | 363/21 |

FOREIGN PATENT DOCUMENTS

2056794 3/1981 United Kingdom .
2137030 9/1984 United Kingdom .

OTHER PUBLICATIONS

Halperin, "Primary Regulated Dual Power Supply", IBM Tech. Disclosure Bull., vol. 21, No. 10, Mar. 1979, p. 4299.
Mazario et al., "Converter Regulation at the Primary," IBM Tech. Disclosure Bull., vol. 27, No. 1A, Jun. 1984, pp. 109–114.

*Primary Examiner*—Patrick R. Salce
*Assistant Examiner*—D. L. Rebsch
*Attorney, Agent, or Firm*—Thomas A. Briody; William J. Streeter; Edward W. Goodman

[57] ABSTRACT

A power supply circuit for converting an input d.c. voltage into a first and a second d.c. output voltage. The power supply circuit includes the series arrangement of an inductor and a controllable switch for receiving the input voltage, the first output voltage being obtained from the resulting square-wave voltage across the inductor. A series resonant circuit followed by a peak-peak rectifier is coupled to the inductor for providing the second output voltage. Arranged as such, variations in a load connected to receive one of the output voltages has substantially no effect on the other output voltage.

5 Claims, 7 Drawing Figures

POWER SUPPLY CIRCUIT HAVING TWO MUTUALLY INDEPENDENT OUTPUTS

BACKGROUND OF THE INVENTION

The invention relates to a power supply circuit for converting an input d.c. voltage into a first output d.c. voltage for application to a first load and into a second output d.c. voltage for application to a second load, the power supply circuit comprising a series arrangement of an inductor and a controllable switch, which series arrangement is connected to a terminal for the input voltage, said switch being, in operation, alternately in the conductive and in the non-conductive states, the first output voltage being derived from a square-wave voltage present across the inductor, the conduction periods of the switch being controlled by means of a control circuit connected to a control electrode of the switch for obtaining for the first output voltage a value which is substantially independent of variations of the input voltage and of the first load, the power supply circuit further comprising a tuned rectifier coupled to the inductor for producing the second output voltage across a smoothing capacitor, said rectifier being such that a half cycle of sinusoidal current flowing therethrough during a period commencing when the switch commences to be conductive does not exceed the conduction time of the switch.

Such a power supply circuit is disclosed in British Patent Application No. 2,056,794 A. In this known circuit the conduction period of the switch is controlled in dependence on variations of the first load and is substantially not influenced by the second load due to the fact that no current flows any longer through the rectifier when the switch is turned off. The rectifier is a peak rectifier which rectifies the peaks of the voltage present across a winding coupled with the inductor for producing the second output voltage. Since the amplitude of these peaks depends on on the first output voltage and therefore on the duty cycle of the switch, it will be clear that the first load has an influence on the second load, which may be undesirable.

SUMMARY OF THE INVENTION

The invention has for its object to provide a power supply circuit of the above-mentioned type wherein substantially no mutual influence exists between the loads. To this end the invention provides a power supply circuit of the type described in the opening paragraph which is characterized in that the tuned rectifier comprises a series resonant network and a peak-peak rectifier connected thereto, a half cycle of the sinusoidal current flowing through the series resonant network not exceeding the time interval between two consecutive edges of the square-wave voltage present across the inductor.

The measure according to the invention provides that the second output voltage does not depend on the peak but on the amplitude of the rectified voltage, which amplitude does not depend on the duty cycle of the switch. Moreover, the series choke, which in the known power supply circuit has to be inserted between the rectifier and the second load, can now be dispensed with.

It will be observed that the use of such a series resonant network with a peak-peak rectifier in a d.c.-d.c. converter is known per se, more specifically from the U.S. Pat. No. 4,017,784. However, the power supply circuit described there has only one output voltage, so that a mutual influence cannot come into question.

DESCRIPTION OF THE DRAWINGS

The invention will now be further described by way of example with reference to the accompanying Figures, in which.

DESCRIPTION OF THE PREFERRED EMBODIMENTS

Figure 1:
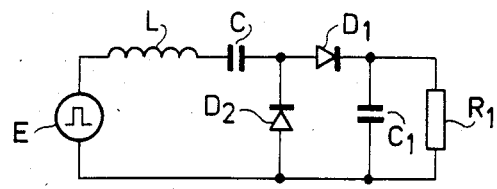
FIG. 1 shows a basic circuit diagram of the circuit according to the invention.

In the basic circuit diagram of FIG. 1, E denotes a generator which generates a square-wave voltage. Connected to generator E is a series resonant network which, in its simplest form, consists of an inductance L and a capacitor C, the internal impedance of generator E being disregarded. By means of its other end, network L, C is connected to the anode of a diode $D_1$ and to the cathode of a diode $D_2$. The cathode of diode $D_1$ is connected to a smoothing capacitor $C_1$, whose other end is connected to the anode of diode $D_2$ and to that terminal of generator E not connected to network L, C. A load, which can be represented as a resistor $R_1$, is in parallel with capacitor $C_1$.

If in the voltage generated by generator E an ascending edge occurs, then the voltage at the junction between diodes $D_1$, $D_2$ and network L, C also increases, causing diode $D_1$ to become conductive. A current which has a sinusoidal variation because of the series resonance flows through elements L, C and $D_1$. This current flows to capacitor $C_1$ to recharge it. After having attained a maximum, the current decreases and becomes zero at a given instant. At that instant, inductance L has no further energy, so that no more current flows through network L, C, while diode $D_1$ becomes non-conducting. The resonant frequency is chosen such that this instant precedes the instant at which the subsequent, descending edge of the square-wave voltage of generator E occurs. This means that a half-cycle of the sinusoidal current is shorter than the time interval between the two considered edges. The choice made ensures that no current depending on load $R_1$ flows through generator E at the instant the descending edge is produced, because the amplitude of the sinusoidal current depends on the value of load $R_1$.

During the time in which the sinusoidal current flows, the voltage at the junction between inductance L and capacitor C varies in accordance with a consinusoidal function, whereafter this voltage remains equal to the voltage across capacitor $C_1$, which may be assumed constant during a short period of time. It can be seen that the value of this voltage, at not too low a value of resistor $R_1$, is equal to the value of the voltage produced by generator E. If now the descending edge occurs in this voltage, then the voltage at the junction between diodes $D_1$, $D_2$ and network L, C also decreases, causing diode $D_2$ to become conductive. A current flows through elements L, C and $D_2$, in the opposite direction relative to that of the preceding current. This current is sinusoidal and as the capacitance of capacitor $C_1$ is, in the majority of cases, many times larger than the capacitance of capacitor C, the frequency of this current is substantially the same as the frequency of the preceding sinusoidal current. Consequently, the duration and amplitude thereof are also substantially the same, because the average value of the current flowing through network L, C is zero between two ascending edges of the square-wave voltage of generator E. The current through diode $D_2$ stops flowing before the next ascending edge of the square-wave voltage occurs. During the period of time in which this current flows, the voltage at the junction between inductance L and capacitor C varies in accordance with a cosinusoidal function, after which this voltage becomes zero.

From the preceding, it will be apparent that the voltage across capacitor $C_1$, provided the value of resistor $R_1$ is not too low, is substantially equal to the amplitude of the square-wave voltage of generator E, which results from the fact that diodes $D_1$ and $D_2$ form a peak-peak rectifier. The voltage applied to resistor $R_1$ is constant if the amplitude is constant. It can also be seen that the load does not influence generator E. Without series resonance, that is to say, at a large value of the capacitance of capacitor C, for example, to the same order of magnitude as the capacitance of capacitor $C_1$, which is indeed a smoothing capacitor, and if a peak rectifier is provided instead of a peak-peak rectifier, current would flow in FIG. 1 through generator E at the occurrence of the edges of the signal from the generator.

Figure 2:
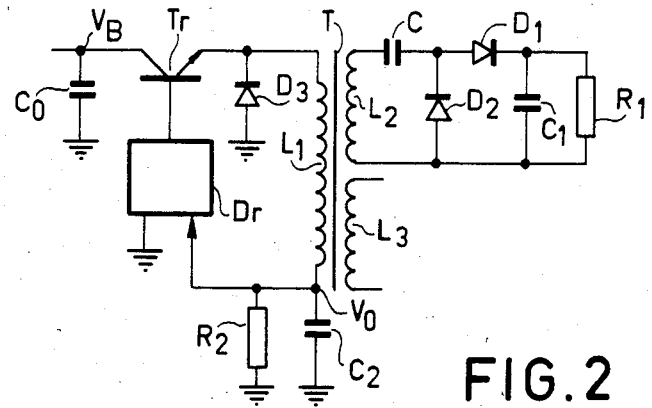
FIG. 2 shows the circuit diagram of a first embodiment of a switched-mode power supply circuit according to the invention.

The circuit of FIG. 2 comprises a switched-mode power supply circuit of the series (forward) type. The collector of an npn-switching transistor Tr is connected to the positive terminal of an input d.c. voltage source whose voltage $V_B$ is smoothed by means of a capacitor $C_o$ and is, for example, derived from electric line voltage by means of rectification. The emitter of transistor Tr is connected to the cathode of a rectifier $D_3$ and to an end of the primary winding $L_1$ of a transformer T, whose other end is connected to a smoothing capacitor $C_2$. The anode of rectifier $D_3$, the other terminal of capacitor $C_2$ and also the negative terminal of the input voltage source are connected to ground. A load, which can be represented as a resistor $R_2$, is arranged in parallel with capacitor $C_2$. Switching pulses, which alternately set the transistor to the conductive and the non-conductive states, are applied to the base of transistor Tr by a driver stage Dr.

Figure 3:
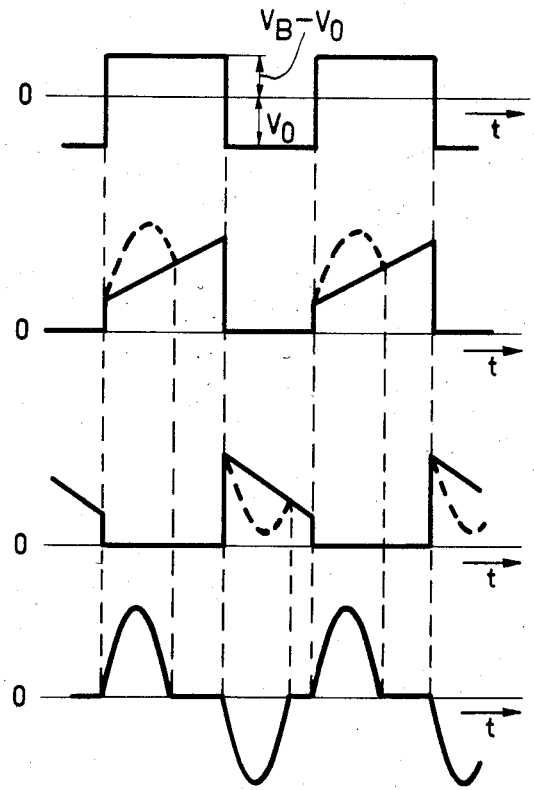
FIG. 3 shows wave-forms occurring in the circuit of FIG. 2.

FIG. 3a shows the variation of the voltage present across winding $L_1$ as a function of the time, while FIG. 3b shows the variation of the emitter current of transistor Tr and FIG. 3c the variation of the current of rectifier $D_3$. During the time transistor Tr conducts, the emitter current increases in a substantially linear way and flows via winding $L_1$ to capacitor $C_2$ and load $R_2$, while rectifier $D_3$ is cut-off. During the period of time, that the transistor is non-conductive, the current through winding $L_1$ also flows through rectifier $D_3$ and decreases in a substantially linear way. A square-wave voltage which, during the period of time transistor Tr conducts, has the value $V_B - V_o$ and which, during the period of time the transistor is non-conductive, has the value $-V_o$, is present across the winding $L_1$. $V_o$ is here the value of the output voltage across capacitor $C_2$. This voltage is fed-back to stage Dr to control the duration of the switching pulses produced by this stage, causing voltage $V_o$ to be kept substantially constant.

All this is well known to a person skilled in the art. Secondary windings are provided on the core of transformer T. In known manner a supply voltage can be derived from one of these windings, $L_3$, for a load, not shown. The network formed by elements C, $D_1$, $D_2$, $C_1$ and $R_1$ is connected to another secondary winding, $L_2$. The capacitance of C is chosen such that the capacitor C and the leakage inductance of transformer T form a series resonant network, the coupling between windings $L_1$ and $L_2$ being less than 1. In operation, a square-wave voltage is present across winding $L_2$, so that the part of FIG. 2 which includes winding $L_2$ and the circuit portions to the left thereof operates as the generator E of FIG. 1, whereas the leakage inductance functions as the inductance L of FIG. 1. In the same way as in FIG. 1, a sinusoidal current flows through capacitor C, which current also flows through diode $D_1$. This occurs during the period of time transistor Tr conducts, in which period supply energy is applied to capacitor $C_1$. The resonant frequency is chosen such that the current stops flowing before the instant at which transistor Tr is cut-off. During the conduction period of rectifier $D_3$, a sinusoidal current flows through diode $D_2$ and capacitor C and this current stops flowing before transistor Tr is again adjusted to the conducting state. FIG. 3d shows both of the half cycles of the sinusoidal current through capacitor C.

Since a sinusoidal current flows through the secondary winding $L_2$ of transformer T, the current through the primary winding comprises a sinusoidal component. This component, which is shown in FIG. 3b and 3c by means of a broken line, flows simultaneously with the current through winding $L_2$. The sinusoidal component is added to the emitter current of transistor Tr, while the sinusoidal component flows through rectifier $D_3$ in the opposite direction and is consequently subtracted from the linear current. When voltage $V_B$ and/or load $R_2$ and/or the load of the supply network connected to winding $L_3$ change, the duration of the time during which transistor $T_3$ conducts changes. The part of the circuit comprising load $R_1$ will not affect the operation of the rest of the circuit if the period of time in which the sinusoidal current component flows through transistor Tr does not exceed the shortest anticipated conduction period of the transistor, and if/the period of time in which the sinusoidal current component flows through rectifier $D_1$ does not exceed the shortest anticipated conduction period of the rectifier, i.e. the time the transistor is non-conductive. A still further condition is that the sinusoidal component flowing through the rectifier must not have such a large amplitude that the rectifier is cut-off. It will be clear to a person skilled in the art that it is possible to design a circuit which satisfies these conditions. Herein, the tuning frquency of the series resonant network and consequently the capacitance of capacitor C is a parameter to be chosen. If necessary, an inductance can be provided in series with capacitor C and with the leakage inductance of transformer T. In a border-line case, the tuning frequency is so low that the time in which current flows through the resonant network is of the same duration as the shortest period of time in which transistor Tr conducts. In this case, the interval in FIG. 3d between the positive and the negative portions is reduced to zero. In a similar way, in a border-line case, the time in which current flows through the series resonant network is of the same duration as the shortest period of time in which transistor Tr is non-conductive, which causes the interval in FIG. 3d between the negative and the positive portions to be reduced to zero. The maximum value of the period of the sinusoidal current must therefore be less than the period of time which is the shorter: either the minimum conduction period or the minimum period of time in which the transistor is non-conductive. This determines the lowest possible value of the tuning frequency. Towards the side of the high-frequencies, the border-line case is the case in which the tuning frequency is so high that the maximum value of the sinusoidal current component reaches the value at which the rectifier becomes non-conductive or reaches the value which is still permissible for the transistor, as a larger amplitude is associated with a shorter pulse duration for the sinusoidal current.

As the change in the current through the transistor, caused by the sinusoidal component, ends prior to or at the end of the conduction time of the transistor, no change occurs in the saturation state of the transistor just before it is switched-off, so that the turn-off period is substantially not affected. So a shift of the turn-off instant as a function of load $R_1$ does not occur, which would indeed be the case in the event of a large capacitance of capacitor C, that is to say at a very low resonant frequency, and if a peak rectifier were used instead of the peak-peak rectifier $D_2$, $D_3$, in which case the total current to capacitor $C_2$ were changed, which would necessitate controlling of transistor Tr. It will be noted that the operation of the circuit is not changed when the series resonant network formed by capacitor C and an inductance is not connected inductively to winding $L_1$ but directly, or if it is connected to the cathode of rectifier $D_3$, as at this cathode a square-wave voltage is present whose edges coincide with those of FIG. 3a, those edges not being affected by load $R_1$, which also holds for the edges of FIG. 3a. It will also be noted that the voltage across capacitor $C_1$ is not constant when voltage $V_o$ is substantially constant, but that it varies somewhat with fluctuations of voltage $V_B$. So a load which is capable of withstanding such a variation will be chosen for load $R_1$.

Figure 4:
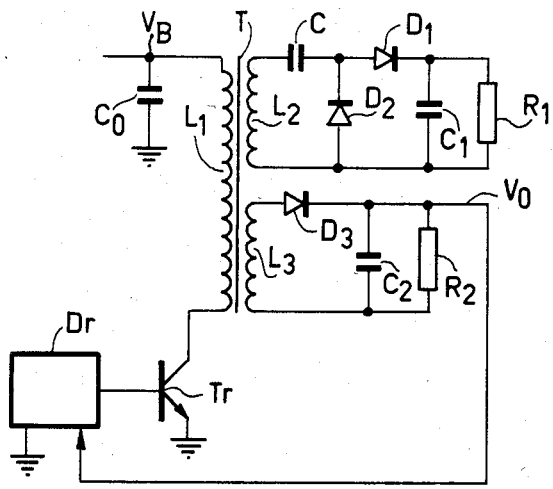
FIG. 4 shows the circuit diagram of a second embodiment of a switched-mode power supply circuit according to the invention.

The switched-mode power supply circuit of FIG. 4 is of the parallel (flyback) type. In this case, the series network of transistor Tr and winding $L_1$ is also connected to source $V_B$, but rectifier $D_3$ is now connected to a secondary winding $L_3$ of transformer T. One end of capacitor $C_2$ is connected to the other electrode of rectifier $D_3$ and its other end to the other end of winding $L_3$. The winding senses of windings $L_1$ and $L_3$ and the conductivity direction of rectifier $D_3$ are chosen such that current flows through the rectifier when transistor Tr is non-conductive and that the rectifier is non-conductive when the transistor conducts. The voltage $V_o$ across capacitor $C_2$, which is applied to load $R_2$, is kept substantially constant by controlling the conduction time of transistor Tr. Square-wave voltages whose edges occur simultaneously are present across windings $L_1$ and $L_3$ and across rectifier $D_3$. The series resonant network and the peak-peak rectifier can therefore be connected to one of these voltages. In FIG. 4 they are connected to a secondary winding $L_2$ of transformer T, the series inductance being provided by the leakage inductance. It can be seen that no influence is exercised on the rest of the circuit when the conditions are the same as in the circuit of FIG. 1.

Figure 5:
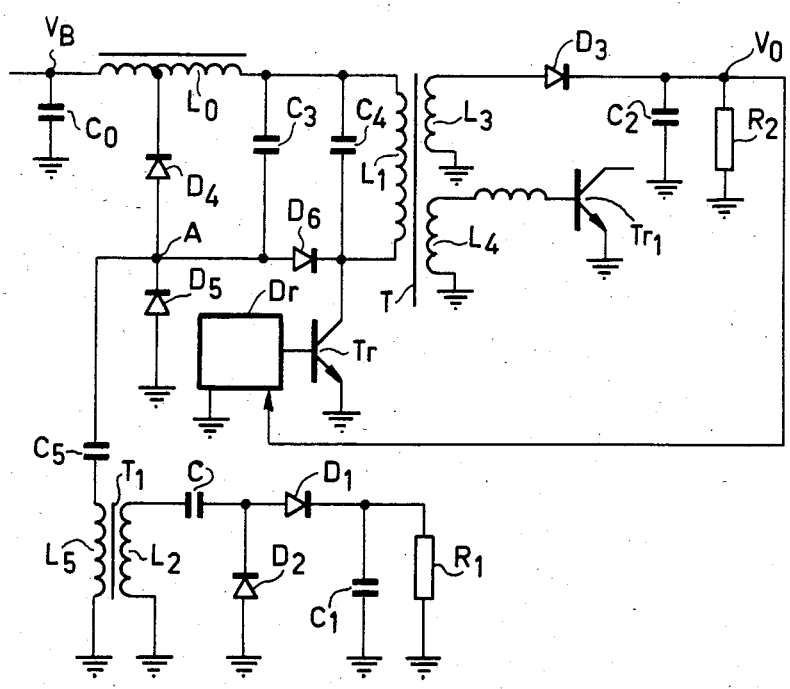
FIG. 5 shows the circuit diagram of a third embodiment of a switched-mode power supply circuit according to the invention.

The invention can be employed with other, known switched-mode power supply circuits. FIG. 5 shows a circuit which is known from the publication "Philips,Electronic components and materials: Technical publication 006", published in 1981. The circuit comprises the series arrangement of two diodes $D_4$ and $D_5$. The cathode of diode $D_4$ is connected to a tap of an inductance $L_o$, one end of which is connected to the positive terminal of source $V_B$. The anode of diode $D_4$ and the cathode of diode $D_5$ are connected to the anode of a further diode $D_6$ and to a capacitor $C_3$. The other end of capacitor $C_3$ is connected to the other end of inductance $L_o$ and to winding $L_1$. The cathode of diode $D_6$ is connected to the other end of winding $L_1$ and to the collector of transistor Tr. A tuning capacitor $C_4$ is arranged in parallel with winding $L_1$ and the emitter of transistor Tr and also the anode of diode $D_5$ are connected to ground. The network comprising elements $L_3$, $D_3$, $C_2$ and $R_2$ is of a construction as shown in FIG. 4 and is provided at the secondary side of transformer T.

The circuit of FIG. 5 can be used to apply supply energy to the different parts of a picture display device, for example, a television receiver. Transistor Tr is supplied with switching pulses of the line frequency and the conduction time of the transistor is controlled in dependence on the voltage $V_o$ across capacitor $C_2$, as a result of which this voltage and consequently also the voltage across capacitor $C_3$ are kept substantially constant. During the major portion of the line period, the so-called trace period, either diode $D_6$, or transistor Tr and diode $D_5$, conduct, so that the voltage across winding $L_1$ is substantially constant. In the remaining portion of the line period, the so-called retrace period, both transistor Tr and diodes $D_5$ and $D_6$ are non-conductive. An oscillation is present in the resonant circuit formed by winding $L_1$ and capacitor $C_4$. The similar oscillation present across winding $L_3$ is rectified by rectifier $D_3$ for the generation of voltage $V_o$. A secondary winding $L_4$ of transformer T is connected to the base of a transistor $Tr_1$ which operates as a line-frequency switch in a line deflection circuit, not shown. Alternatively, transistor $Tr_1$ can be applied with control signals from stage Dr.

FIG. 6a shows the variation as a function of the time of the voltage at the collector of transistor Tr and FIG. 6b shows the corresponding variation at the junction A of diodes $D_4$, $D_5$ and $D_6$. In FIG. 6c, the variation of the collector current of transistor Tr is plotted, while in FIG. 6d the variation of the current through diode $D_5$, in FIG. 6e the variation of the current through diode $D_4$ and in FIG. 6f the variation of the current through diode $D_6$ have been plotted. At an instant $t_1$ transistor Tr is rendered conductive, as a result of which diode $D_6$ also conducts. After the current which flows through winding $L_1$ and has a substantially linear variation during the trace period has reversed its direction, diode $D_6$ is rendered non-conductive at an instant $t_2$, whereafter diode $D_5$ carries current. The current through diode $D_5$ also flows through capacitor $C_3$, winding $L_1$ and transistor Tr. At the instant $t_3$ at the end of the trace period, transistor Tr is rendered non-conductive, as a result of which also diode $D_5$ becomes currentless, while diode $D_4$ becomes conductive. Between instants $t_1$ and $t_3$, point A is clamped to ground.

At the end instant $t_4$ of the retrace period, diode $D_6$ becomes conductive. Until the instant $t'_1$ at which transistor Tr is again rendered conductive, the voltage at the collector remains at substantially the same level as at the tap of inductance $L_o$.

An isolating capacitor $C_5$ is connected to point A whose other end is connected to the primary winding $L_5$ of a transformer $T_1$. Winding $L_2$ is in the form of a secondary winding of this transformer and elements C, $D_1$, $D_2$, $C_1$ and R are connected in the same way as in FIGS. 1, 2 and 4. A current which varies similarly as in FIG. 3d flows through winding $L_2$ which causes a sinusoidal current component shown in FIG. 6 by means of broken lines to flow in some elements of the circuit. After instant $t_1$, a sinusoidal component flows through winding $L_5$, capacitor $C_5$, diode $D_6$ and transistor Tr. This causes diode $D_6$ to become currentless at an instant located somewhat after instant $t_2$. At the same instant, diode $D_5$ becomes conductive. The sinusoidal component flows through diode $D_5$ from the cathode to the anode, the diode $D_5$ being kept in the conducting state by the larger current to capacitor $C_3$, winding $L_1$ and transistor Tr. This component stops flowing prior to instant $t_3$. After instant $t_3$, a sinusoidal current component flows through winding $L_5$ and capacitor $C_5$ in the opposite direction. This component flows through diode $D_4$, which is kept in the conducting state by the larger charging current of capacitor $C_3$, from the cathode to the anode and stops flowing before the instant $t'_1$ at which transistor Tr is rendered conductive one cycle after instant $t_1$.

Figure 6:
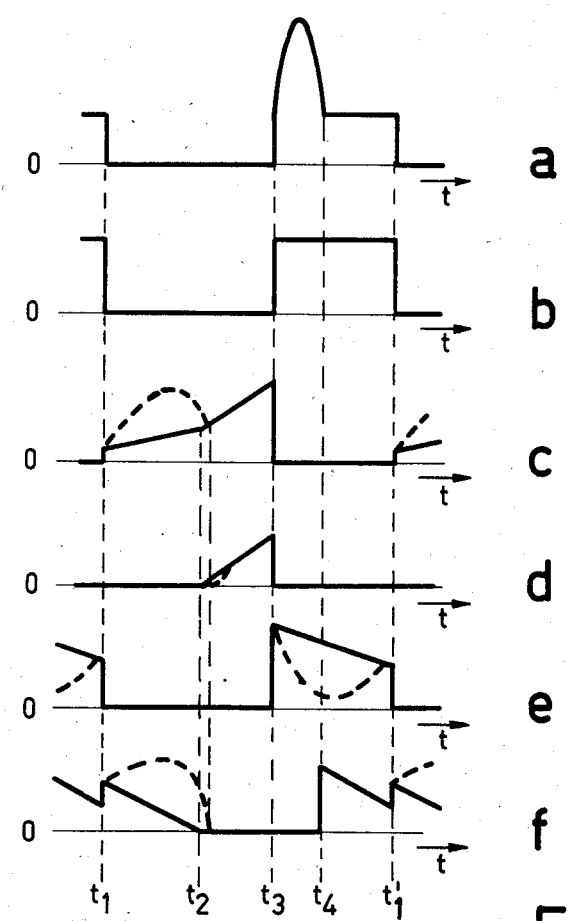
FIG. 6 shows wave-forms occurring in the circuit shown in FIG. 5.

FIG. 6 shows that the operation of the circuit is substantially not affected by the addition of the circuit portion comprising load $R_1$, if the same conditions as in the foregoing are satisfied, that is to say if the different edges are not shifted as a function of $R_1$ and no switching element is prematurely rendered non-conductive. The tuning frequency of the series resonant network is determined by the two capacitors C and $C_5$. It will be obvious that the series network of elements $C_5$ and $L_5$ may alternatively be provided between point A and a point on inductance $L_o$, for example the tap to which diode $D_4$ is connected, or to the end connected to capacitor $C_o$, as a square-wave voltage whose edges also occur at instants $t_1$ and $t_3$ is present between the said points.

Figure 7:
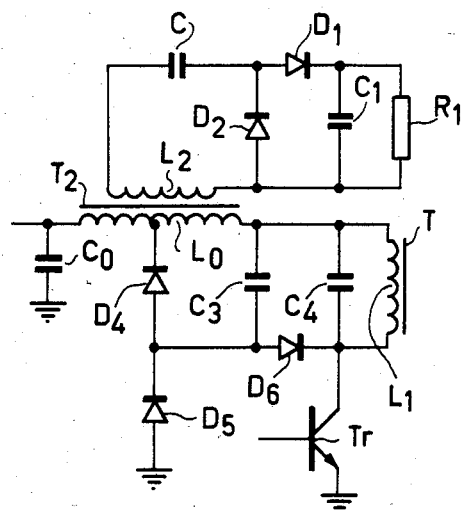
FIG. 7 shows the circuit diagram of a fourth embodiment of a switched-mode power supply circuit according to the invention.

A similar voltage is also present across inductance $L_o$, which functions as a charging coil. Diode $D_4$ does not conduct between instants $t_1$ and $t_3$, while point A is connected to ground so that the voltage across inductance $L_o$ is equal to $V_B - V_C$, $V_C$ being the voltage of capacitor $C_3$. Diode $D_4$ conducts between instants $t_3$ and $t'_1$ and the voltage across inductance $L_o$ is equal to $V_C/(1-n)$ where n is the ratio between the number of turns of inductance $L_o$ to the left of the tap in FIG. 5 and the total number of turns of the inductance. In FIG. 7 inductance $L_o$ is the primary winding of a transformer $T_2$ whose winding $L_2$ is a second winding to which elements C, $D_1$, $D_2$, $C_1$ and $R_1$ are connected in a similar way as in FIGS. 2, 4 and 5. In all further respect the circuit of FIG. 7 is identical to the circuit of FIG. 5, it being possible to omit capacitor $C_5$ and transformer $T_1$, and it operates in the same way.

As the circuit of FIG. 5 as well as the circuit of FIG. 7 drive the line deflection circuit, the maximum duration of the conduction time of transistor Tr is equal to approximately 52 μs, i.e. the duration of the trace period at a line period of approximately 64 μs (European and United States television standards). So the minimum duration of the non-conductive period is approximately 12 μs. Transistor Tr must conduct without fail in the center of the trace period, so that the minimum duration of the conduction period is approximately 26 μs. From this it will be obvious that the minimum duration of the half cycle of the sinusoidal component is approximately 12 μs, which corresponds to a maximum resonant frequency of approximately 41.7 kHz. In practice, the maximum conduction time of transistor Tr is approximately 44 μs, so that the minimum duration of the non-conductive period is approximately 20 μs, which corresponds to a series resonance of approximately 25 kHz. Such a resonance is used in a practical embodiment of the circuit shown in FIG. 7, the capacitance of capacitor C, which depends on the leakage inductance of transformer $T_2$ being less than approximately 5 μF and the voltage of capacitor $C_3$ being kept substantially constant at approximately 100 V at variations of the mains voltage between 160 and 260 V and a nominal value of 220 V. Capacitor $C_1$ had a capacitance of 2000 μF and load $R_2$ was in the form of the supply power for a class-B audio section having a continuous power of 2×15 W, i.e. a section for which the supply voltage need not be constant, whereas the rest of the receiver was supplied with energy with the aid of transformer T.

It will be obvious that the invention may alternatively be used in variations of the described embodiments of generator E. The nature of the different switches is not important. Thus, the transistors may be replaced by gate turn-off switches. The peak-peak rectifier shown in FIGS. 1, 2, 4, 5 and 7 may alternatively be constructed in a different, known way.

What is claimed is:

1. A power supply circuit for converting an input d.c. voltage into a first output d.c. voltage which is applied to a first load and into a second output d.c. voltage which is applied to a second load, said power supply circuit comprising the series arrangement of an inductor and a controllable switch, which series arrangement is connected to a terminal for the input voltage, said switch being, in operation, alternatively in the conductive and in the non-conductive states, the first output voltage being derived from a square-wave voltage present across the inductor, the conduction periods of the switch being controlled by means of a control circuit connected to a control electrode of the switch for obtaining for the first output voltage, a value which is substantially independent of variations of the input voltage and of the first load, the power supply circuit further comprising a tuned rectifier coupled to the inductor for producing the second output voltage across a smoothing capacitor, said rectifier being such that a half cycle of sinusoidal circuit flowing therethrough during a period commencing when the switch commences to be conductive, does not exceed the conduction time of the switch, characterized in that the tuned rectifier comprises a series resonant network and a peak-peak rectifier connected thereto, a half cycle of the sinusoidal current flowing through the series resonant network not exceeding the time interval between two consecutive edges of the square-wave voltage present across the inductor whereby variations in the value of one of said loads has substantially no effect on the voltage across the other of said loads.

2. A circuit as claimed in claim 1, characterized in that a rectifier is coupled to the switch, which rectifier is in the conductive state when the switch is in the non-conductive state and is non-conductive when the switch is conductive, the peak-peak rectifier being connected via the series resonant network for rectifying a square-wave voltage present across the peak-peak rectifier or a square-wave voltage whose edges occur simultaneously therewith, the conduction time of the switch and the conduction time of the rectifier both being not shorter than the half cycle period of the sinusoidal current flowing through the series resonant network.

3. A circuit as claimed in claim 2, characterized in that the series arrangement of an isolating capacitor and the primary winding of a transformer is connected between two points between which the square-wave voltage is present, the series resonant network being connected to a secondary winding of the transformer and the series resonance also being determined by the isolating capacitor.

4. A circuit as claimed in claim 1, characterized in that the inductor forms the primary winding of a transformer, the series resonant network being connected to a secondary winding of the transformer.

5. A circuit as claimed in claim 1, 2, 3 or 4, characterized in that the peak-peak rectifier comprises the series arrangement of two diodes having the same forward directions, the series arrangement formed being arranged in parallel with the smoothing capacitor and the junction between the diodes being connected to the series resonant network.

* * * * *